United States Patent
Baron Von Ceumern-Lindenstjerna et al.

(10) Patent No.: US 11,668,217 B2
(45) Date of Patent: Jun. 6, 2023

(54) METHOD AND DEVICE FOR EXHAUST GAS AFTERTREATMENT IN AN INTERNAL COMBUSTION ENGINE

(71) Applicants: VOLKSWAGEN AKTIENGESELLSCHAFT, Wolfsburg (DE); Dr. Ing. h.c. F. Porsche Aktiengesellschaft, Stuttgart (DE)

(72) Inventors: Falk-Christian Baron Von Ceumern-Lindenstjerna, Braunschweig (DE); Stefan Paukner, Wolfsburg (DE); Michael Kaack, Roetgesbuettel (DE); Sebastian Hemminger, Oberriexingen (DE)

(73) Assignees: VOLKSWAGEN AKITENGESELLSCHAFT, Wolfsburg (DE); Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 17/825,445

(22) Filed: May 26, 2022

(65) Prior Publication Data
US 2022/0282655 A1 Sep. 8, 2022

Related U.S. Application Data

(62) Division of application No. 16/750,326, filed on Jan. 23, 2020, now abandoned.

(30) Foreign Application Priority Data

Jan. 23, 2019 (DE) ...................... 10 2019 101 576.6

(51) Int. Cl.
*F01N 3/20* (2006.01)
*F01N 3/025* (2006.01)
(Continued)

(52) U.S. Cl.
CPC ........... *F01N 3/2033* (2013.01); *F01N 3/025* (2013.01); *F01N 3/101* (2013.01); *F01N 13/0093* (2014.06); *F01N 2240/14* (2013.01); *F01N 2560/025* (2013.01); *F01N 2900/1624* (2013.01)

(58) Field of Classification Search
CPC ...... F01N 3/0864; F01N 3/101; F01N 3/2033; F01N 13/0093; F01N 2240/14;
(Continued)

(56) References Cited

U.S. PATENT DOCUMENTS 6,854,263 B1 2/2005 Brück et al.
2011/0072784 A1 3/2011 Hepburn et al.
(Continued)

FOREIGN PATENT DOCUMENTS

CN 102434258 A 5/2012
CN 106414929 A 2/2017
(Continued)

OTHER PUBLICATIONS

Machine translation of DE102012021573A1, accessed Oct. 20, 2022. (Year: 2022).*
(Continued)

*Primary Examiner* — Jonathan R Matthias
(74) *Attorney, Agent, or Firm* — Pearl Cohen Zedek Latzer Baratz LLP

(57) ABSTRACT

A device for exhaust gas aftertreatment in an internal combustion engine can be connected to an outlet of the internal combustion engine. The device comprises an exhaust gas system with an exhaust gas channel in which a three-way catalytic converter is arranged, and an exhaust gas burner with which hot burner exhaust gases can be fed into the exhaust gas channel at a feed point upstream from the three-way catalytic converter. The three-way catalytic converter is configured as a lambda probe catalytic converter and comprises a first catalyst volume and a second catalyst (Continued)

volume, whereby a lambda probe is arranged downstream from the first catalyst volume and upstream from the second catalyst volume, whereby the first catalyst volume has a lower oxygen storage capacity than the second catalyst volume. A method for exhaust gas aftertreatment in an internal combustion engine has such an exhaust gas aftertreatment device.

4 Claims, 3 Drawing Sheets

(51) Int. Cl.
*F01N 3/10* (2006.01)
*F01N 13/00* (2010.01)

(58) Field of Classification Search
CPC ............ F01N 2240/16; F01N 2570/16; F01N 2900/1624; F01N 3/025
See application file for complete search history.

(56) References Cited

U.S. PATENT DOCUMENTS

| | | |
|---|---|---|
| 2012/0067026 A1 | 3/2012 | Gonze et al. |
| 2019/0195115 A1 | 6/2019 | Paukner et al. |
| 2019/0211725 A1 | 7/2019 | Paukner et al. |
| 2020/0116061 A1 | 4/2020 | Hupfeld et al. |

FOREIGN PATENT DOCUMENTS

| | | | |
|---|---|---|---|
| DE | 43 40 613 A1 | 6/1995 | |
| DE | 195 08 013 C1 | 3/1996 | |
| DE | 19946044 C1 | 1/2001 | |
| DE | 10 2010 027 984 A1 | 10/2011 | |
| DE | 10 2010 062 257 A1 | 6/2012 | |
| DE | 1 02012021573 A1 | 5/2014 | |
| DE | 10 2012 021 573 A1 | 5/2014 | |
| DE | 102014000871 B3 * | 4/2015 | ........... F01N 3/2033 |
| DE | 10 2016 206 394 A1 | 10/2017 | |
| DE | 10 2017 113 366 A1 | 12/2018 | |
| DE | 10 2017 130 886 A1 | 6/2019 | |
| EP | 3 508 704 A1 | 7/2019 | |
| JP | H05 86845 | 4/1993 | |
| WO | WO 9514852 A1 | 6/1995 | |

OTHER PUBLICATIONS

Search report for German Patent Application No. 10 2019 101 576.6, dated Dec. 12, 2019.
Search report for European Patent Application No. EP 20 15 3329, dated May 19, 2020.
Office Action for Chinese Patent Application No. 202010075072.8, dated Aug. 2, 2021.

* cited by examiner

METHOD AND DEVICE FOR EXHAUST GAS AFTERTREATMENT IN AN INTERNAL COMBUSTION ENGINE

CROSS REFERENCE TO RELATED APPLICATIONS

This application is a divisional of U.S. patent application Ser. No. 16/750,326, filed Jan. 23, 2020, which claims priority from German Patent Application No. 10 2019 101576.6, filed Jan. 23, 2019, which is incorporated by reference in its entirety.

FIELD OF THE INVENTION

The invention relates to a device for exhaust gas aftertreatment in an internal combustion engine as well as to a method for exhaust gas aftertreatment in an internal combustion engine.

BACKGROUND OF THE INVENTION

Current legislation on exhaust-gas emissions, which will become increasingly stringent in the future, makes high requirements regarding raw engine emissions and the exhaust gas aftertreatment in internal combustion engines. Moreover, the period of time immediately after a cold start of the internal combustion engine has acquired special significance in terms of the emissions since, during this phase, the exhaust gas aftertreatment components are supposed to be heated up to their operating temperature as quickly as possible in order to permit an efficient exhaust gas aftertreatment. In the case of gasoline engines, especially the heating up of a three-way catalytic converter (that is near the engine) is decisive for the emissions of a motor vehicle. The state of the art discloses internal combustion engines that have a secondary air system, wherein, in order to heat up the three-way catalytic converter, secondary air is introduced into the exhaust gas system downstream from an outlet of the internal combustion engine and upstream from the three-way catalytic converter. Furthermore, exhaust gas aftertreatment systems having an exhaust gas burner are known, wherein a hot exhaust gas from the exhaust gas burner is fed into the exhaust gas system in order to heat the three-way catalytic converter up to its operating temperature. Thanks to an exhaust gas burner, a three-way catalytic converter situated in the undercarriage of the motor vehicle can also be heated up to its operating temperature immediately after a cold start of the internal combustion engine since the hot burner gases can be fed into the exhaust gas system at an appropriate place, thereby allowing the three-way catalytic converter to be heated up, essentially independently of the exhaust gas stream from the internal combustion engine.

German patent application DE 195 08 013 A1 discloses an exhaust gas aftertreatment system for an internal combustion engine that comprises an exhaust gas burner with a secondary air system with which a hot burner exhaust gas is fed into the exhaust gas channel of the internal combustion engine upstream from a three-way catalytic converter in order to heat the three-way catalytic converter up to its operating temperature as quickly as possible.

German patent application DE 10 2010 027 984 A1 discloses a method for operating an exhaust gas system of an internal combustion engine in which at least one parameter of the exhaust gas that is flowing in an exhaust gas channel of the internal combustion engine is detected by an exhaust gas probe. In this process, during an operating state of the internal combustion engine in which no fuel is being injected into the combustion chambers of the internal combustion engine, secondary air is blown into the exhaust gas channel and the exhaust gas probe is adjusted while the secondary air is being blown in or else thereafter.

German patent application DE 10 2010 062 257 A1 discloses a device for exhaust gas aftertreatment in an internal combustion engine, wherein a burner is provided with which the exhaust gas temperature can be raised downstream from an outlet of the internal combustion engine and upstream from an exhaust gas aftertreatment component.

SUMMARY OF THE INVENTION

Before this backdrop, the invention is based on the objective of permitting the three-way catalytic converter to be heated up as quickly as possible during the cold start phase and keeping the emissions as low as possible during the heating up of the three-way catalytic converter.

According to the invention, this objective is achieved by a device for exhaust gas aftertreatment in an internal combustion engine that can be connected to an outlet of the internal combustion engine, whereby the device comprises an exhaust gas system with an exhaust gas channel in which a three-way catalytic converter is arranged. The device also comprises an exhaust gas burner, whereby, on the exhaust gas channel upstream from the three-way catalytic converter, there is a feed point for the burner exhaust gases from the exhaust gas burner. It is provided for the three-way catalytic converter to be configured as a lambda probe catalytic converter, whereby a lambda probe is arranged downstream from a first catalyst volume of the three-way catalytic converter and upstream from a second catalyst volume of the three-way catalytic converter. In this context, the first catalyst volume has a lower oxygen storage capacity than the second catalyst volume. The combination of an exhaust gas burner with a lambda probe catalytic converter makes it possible to minimize the emissions during the heating phase of the three-way catalytic converter. Here, the mixed lambda value from the exhaust gas of the internal combustion engine and from the burner exhaust gas is regulated by means of the lambda probe of the lambda probe catalytic converter so as to obtain a stoichiometric exhaust gas. The three-way catalytic converter has an oxygen storage capacity (OSC).

This oxygen storage capacity causes any deviation of the lambda signal at the lambda probe of the lambda probe catalytic converter to be detected with a time delay. For this reason, the lambda probe is positioned closer to the inlet of the three-way catalytic converter than to the outlet, so that the oxygen storage capacity of the second catalyst volume is greater than the oxygen storage capacity of the first catalyst volume. Consequently, the second catalyst volume of the three-way catalytic converter can be used to avoid a rich blow-out or a lean blow-out. Moreover, the functionality of the three-way catalytic converter can be diagnosed with the lambda probe without a lambda blow-out occurring during the diagnosis.

The features described in the dependent claims yield advantageous improvements and non-trivial refinements of the device for exhaust gas aftertreatment put forward in the independent claim.

In a preferred embodiment of the invention, it is provided for the first catalyst volume to make up 15% to 35% of the total volume of the three-way catalytic converter and for the second catalyst volume to make up 65% to 85% of the total volume of the three-way catalytic converter. An appropriate distribution of the catalyst volumes can ensure that, during sub-stoichiometric or super-stoichiometric operation of the exhaust gas burner, there is always a sufficient oxygen storage capacity available in the second catalyst volume so that a rich blow-out or a lean blow-out through the three-way catalytic converter can be prevented in an operationally reliable manner.

In an advantageous embodiment of the device, it is provided for the lambda probe to be configured as a step change sensor. A step change sensor can very easily detect the change-over between a sub-stoichiometric and a super-stoichiometric exhaust gas at the lambda probe. Consequently, the air-fuel ratio of the exhaust gas burner can be adapted by adapting the quantity of fuel accordingly in order to initiate a change between sub-stoichiometric and super-stoichiometric operation.

As an alternative, it is advantageously provided for the lambda probe to be configured as a broadband probe. Alternatively, the lambda value in the exhaust gas can also be determined by means of a broadband probe. However, a broadband probe is generally more expensive than a step change sensor and it is less sensitive around the change-over point ($\lambda=1$). However, a broadband probe offers the possibility to detect the lambda value not only qualitatively but also quantitatively.

In another improvement of the invention, it is provided for the exhaust gas channel to be configured without a lambda probe downstream from the feed point and upstream from the three-way catalytic converter. Since additional lambda probes can be dispensed with, the costs incurred for the exhaust gas aftertreatment system can be reduced. Another lambda probe is not absolutely necessary either since the air-fuel ratio of the exhaust gas burner is not regulated directly, but rather by means of a pilot control with an appropriately variable amplitude.

As an alternative, another lambda probe can also be arranged in the exhaust gas channel upstream from the feed point so that the air-fuel ratio of the internal combustion engine can be regulated more precisely.

In a preferred embodiment of the device, it is provided for a secondary air system to be associated with the exhaust gas burner in order to control the quantity of fresh air that is fed to the exhaust gas burner. Thanks to a secondary air system, the quantity of fresh air that is fed to the exhaust gas burner can be precisely regulated, as a result of which the air-fuel ratio of the exhaust gas burner can be adjusted so as to have a small fluctuation range.

Furthermore, it is advantageously provided for the exhaust gas burner to comprise a fuel injector with which fuel can be introduced into a combustion chamber of the exhaust gas burner. A fuel injector can serve to set the air-fuel ratio of the exhaust gas burner in a very simple manner. In this process, in particular, a constant quantity of fresh air is selected and the air-fuel ratio of the exhaust gas burner is adapted by increasing or decreasing the quantity of fuel injected by means of the fuel injector.

In a preferred embodiment of the invention, a turbine of an exhaust gas turbocharger is arranged in the exhaust gas system upstream from the three-way catalytic converter. In a preferred embodiment of the invention, the internal combustion engine is configured as an internal combustion engine that is charged by means of an exhaust gas turbocharger, whereby a turbine of the exhaust gas turbocharger is arranged in the exhaust gas channel downstream from the outlet and upstream from the catalytic converter. The turbine of the exhaust gas turbocharger mixes the hot burner exhaust gas with the exhaust gas from the internal combustion engine, thereby achieving a homogeneous exhaust gas with a uniform distribution of the unburned exhaust gas components or the residual oxygen stemming from the burner exhaust gas. Consequently, the unburned exhaust gas components can be reacted with the oxygen from the secondary air feed on the catalytically active surface of the catalytic converter, as a result of which the temperature of the three-way catalytic converter rises further.

As an alternative, however, the internal combustion engine can also be configured as a naturally aspirated engine since a turbine in the exhaust gas system is not an absolutely necessary prerequisite.

According to the invention, a method is being proposed for exhaust gas aftertreatment in an internal combustion engine having a device according to the invention for exhaust gas aftertreatment, comprising the following steps:
   activating the exhaust gas burner, whereby the quantity of fuel fed to the exhaust gas burner is pilot-controlled,
   detecting the air-fuel ratio downstream from the first catalyst volume and upstream from the second catalyst volume of the three-way catalytic converter,
   changing the quantity of fuel when a rich blow-out or a lean blow-out is detected at the lambda probe.

The proposed method makes it possible to regulate the air-fuel ratio of the internal combustion engine in such a way that an emission optimum is achieved along with a maximum heating effect. For this purpose, the exhaust gas mixed lambda value is ascertained during the heating phase of the catalytic converter and any deviation from a stoichiometric air-fuel ratio is transformed into a value to correct the fuel mixture. In this manner, the correction can be made by adapting the quantity of fuel which is injected into the combustion chambers of the internal combustion engine and which, in conjunction with the introduced burner exhaust gas, yields the emission-neutral exhaust gas mixed lambda value of 1, in other words, a stoichiometric exhaust gas. In this process, the lambda probe identifies the rich or lean blow-outs in a timely fashion, so that these can be compensated for by the second catalyst volume downstream from the lambda probe, and lambda blow-outs through the three-way catalytic converter can be prevented in an operationally reliable manner.

In this context, it is especially preferable for the air mass flow fed to the exhaust gas burner to be kept constant and for the adaptation of the air-fuel ratio of the exhaust gas burner to be effectuated by adapting the quantity of fuel that is injected into the combustion chamber of the exhaust gas burner. As a result, a very simple and precise pilot control of the air-fuel ratio of the exhaust gas burner is possible.

In an advantageous embodiment of the method, it is provided that, in a first operating state of the exhaust gas burner, the quantity of fuel of the exhaust gas burner is pilot-controlled in such a way that the exhaust gas burner is operated with a sub-stoichiometric air-fuel ratio and, in a second operating state, it is pilot-controlled in such a way that the exhaust gas burner is operated with a super-stoichiometric air-fuel ratio. A change between a sub-stoichiometric air-fuel ratio and a super-stoichiometric air-fuel ratio can ensure that unburned exhaust gas components, especially carbon monoxide, unburned hydrocarbons and hydrogen, are oxidized and nitrogen oxides are reduced. In this manner, the emissions during the heating phase of the three-way catalytic converter can be minimized.

In this context, it is especially preferred for the exhaust gas burner to be operated alternately with a sub-stoichiometric air-fuel ratio and with a super-stoichiometric air-fuel ratio. Thanks to this alternating operation, lambda blow-outs during the heating phase can be avoided, thereby ensuring an effective heating of the three-way catalytic converter and a simultaneous minimization of the tailpipe emissions.

Here, it is advantageously provided for the sub-stoichiometric air-fuel ratio to be pilot-controlled in the range from 0.93 to 0.98. A sub-stoichiometric burner exhaust gas in a lambda range between 0.93 and 0.98 ensures a slow clearing out of the oxygen storage means of the three-way catalytic converter. The clearing out is slow enough that neither elevated secondary emissions nor a lean blow-out through the three-way catalytic converter occurs.

Moreover, it is advantageously provided for the super-stoichiometric air-fuel ratio to be pilot-controlled in the range from 1.02 to 1.07. Owing to a super-stoichiometric air-fuel ratio in the range from 1.02 to 1.07, the oxygen storage means of the three-way catalytic converter is filled slowly. This ensures that a lean blow-out and an associated increase in the nitrogen oxide emissions are prevented in an operationally reliable manner. At the same time, there is sufficient oxygen to oxidize the unburned exhaust gas components, especially unburned hydrocarbons, carbon monoxide and hydrogen, thereby minimizing the emissions.

In another preferred embodiment of the invention, it is provided for the exhaust gas burner to be deactivated once the three-way catalytic converter has reached a threshold temperature. As a result, once the threshold temperature has been reached, it is possible to change over to an operating state with lower raw emissions and a greater efficiency of the internal combustion engine. As a result, the duration of the heating operation of the catalytic converter can be limited and the fuel efficiency of the internal combustion engine can be increased.

Here, it is especially preferable for the threshold temperature to be the light-off temperature of a three-way catalytically active coating of the catalytic converter. Above the light-off temperature, an efficient conversion of pollutants in the exhaust gas of the internal combustion engine can be ensured by means of the catalytic converter. In this context, further heating due to the exothermic conversion of unburned exhaust gas components, especially unburned hydrocarbons and carbon monoxide, can take place on the catalytically active surface of the catalytic converter.

Unless otherwise indicated in a specific case, the various embodiments of the invention cited in this application can be advantageously combined with each other.

BRIEF DESCRIPTION OF THE DRAWINGS

The invention will be explained below on the basis of embodiments making reference to the accompanying drawings. In this context, identical components or components having the same function are provided with the same reference numerals in the various figures. The following is shown.

DETAILED DESCRIPTION OF THE INVENTION

Figure 1:
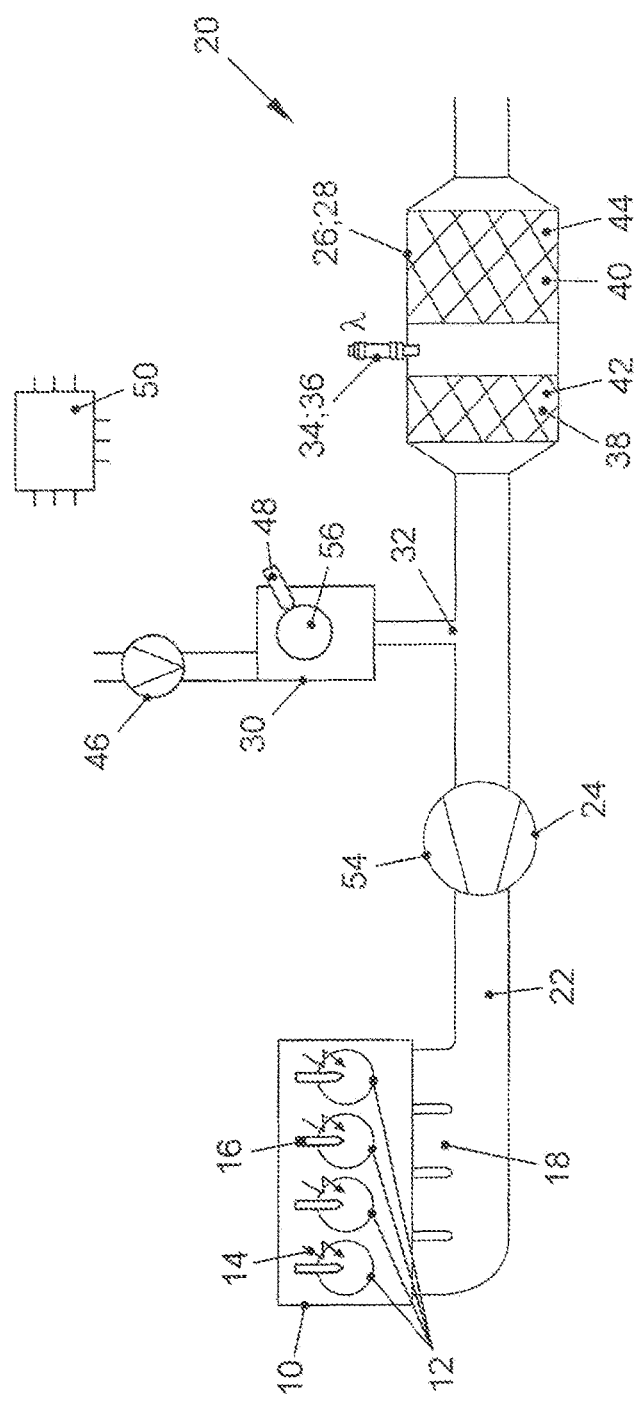
FIG. 1 is a first embodiment of a schematically depicted internal combustion engine with a device according to the invention for exhaust gas aftertreatment.

FIG. 1 shows an internal combustion engine 10 which has several combustion chambers 12 and whose outlet 18 is connected to an exhaust gas system 20. The internal combustion engine 10 is configured as a direct-injection gasoline engine. Each of the combustion chambers 12 has a spark plug 14 and a fuel injector 16 for purposes of injecting fuel into the appertaining combustion chamber 12 and igniting the fuel-air mixture. The exhaust gas system 20 comprises an exhaust gas channel 22 in which a turbine 24 of an exhaust gas turbocharger 54 and, downstream from the turbine 24, a three-way catalytic converter 26 are arranged in the direction in which exhaust gas from the internal combustion engine 10 flows through the exhaust gas channel. The three-way catalytic converter 26 is configured as a lambda probe catalytic converter 28. For this purpose, the three-way catalytic converter 26 has a first catalyst volume 38 and a second catalyst volume 40 arranged downstream from the first catalyst volume 38, whereby a lambda probe 34 is arranged in the housing of the three-way catalytic converter 26 downstream from the first catalyst volume 38 and upstream from the second catalyst volume 40. As shown in FIG. 1, the lambda probe 34 is preferably configured as a step change sensor 36 and can thus detect a change-over between a sub-stoichiometric and a super-stoichiometric exhaust gas. The oxygen storage means 42 of the first catalyst volume 38 is smaller than the oxygen storage means 44 of the second catalyst volume 40, so that the second catalyst volume 40 has a greater oxygen storage capacity than the first catalyst volume 38. The lambda probe 34 is arranged in the front section of the three-way catalytic converter 26, whereby the first catalyst volume 38 comprises about one-third while the second catalyst volume 40 comprises about two-thirds of the total catalyst volume of the three-way catalytic converter 26.

The exhaust gas system 20 also comprises an exhaust gas burner 30 that is supplied with fresh air via a secondary air system 46 and with fuel via a fuel line. The exhaust gas burner 30 comprises a combustion chamber 56 into which a combustible fuel can be introduced by means of a fuel injector 48. Preferably, the fuel injector 48 of the exhaust gas burner 30 and the fuel injectors 16 of the internal combustion engine 10 are supplied with fuel from a shared tank. Downstream from the outlet 18 and upstream from the three-way catalytic converter 26, there is a feed point 32 on the exhaust gas channel 22 where the hot burner exhaust gas of the exhaust gas burner 30 is fed into the exhaust gas channel 22 in order to heat the three-way catalytic converter 26 up to its operating temperature after a cold start of the internal combustion engine 10. There can be additional catalytic converters upstream from the feed point 32 or downstream from the three-way catalytic converter 26. Moreover, the internal combustion engine 10 has an engine control unit 50 with which the quantity of fuel injected into the combustion chambers 12 can be regulated. Moreover, the exhaust gas burner 30 can be controlled by the engine control unit 50.

After a cold start of the internal combustion engine 10, the exhaust gas burner 30 is activated by the engine control unit 50 so that the three-way catalytic converter 26 can be heated up as quickly as possible to the light-off temperature of the three-way catalytic converter 26 that is needed for a high conversion rate. During this active heating phase, the regulation of the lambda value is carried out in such a way that the gaseous emissions of the internal combustion engine 10 are as low as possible until the three-way catalytic converter 26 has reached its light-off temperature. In order to generate the smallest possible gaseous emissions during the active heating phase, it is necessary to regulate the mixed lambda value from the exhaust gas of the internal combustion engine 10 and from the burner exhaust gas of the exhaust gas burner 30 so as to obtain a stoichiometric ratio. This regulation takes place via the lambda probe 34 in the lambda probe catalytic converter 28. In order for the lambda probe 34 in the lambda probe catalytic converter 28 to be able to appropriately regulate the air-fuel ratio, the exhaust gas channel 22 is configured without an additional catalytic converter downstream from the feed point 32 and upstream from the lambda probe catalytic converter 28. The three-way catalytic converter 26 has an oxygen storage capacity (OSC). This oxygen storage capacity causes the deviation of the lambda signal in the direction of sub-stoichiometric or super-stoichiometric to be detected by the lambda probe 34 with a time delay. For this reason, the first catalyst volume 38 is configured to be smaller than the second catalyst volume 40. Consequently, the second catalyst volume can be used to prevent a blow-out in the direction of "rich" or "lean". Moreover, the functionality of the three-way catalytic converter 26 can be diagnosed with the lambda probe 34, without a rich blow-out or lean blow-out occurring during the diagnosis by means of the lambda probe 34.

Since the exhaust gas channel 22 is configured without an additional lambda probe upstream from the three-way catalytic converter 26, the burner mixture of the exhaust gas burner 30 cannot be regulated directly. The exhaust gas burner 30 is pilot-controlled and impinged with a forced amplitude. The lambda value of the exhaust gas burner 30 is pilot-controlled via the quantity of fuel metered into the combustion chamber 56. The forced amplitude is selected, for example, with a distance of 5% to a stoichiometric air-fuel ratio each time, so that the exhaust gas burner 30 alternates between operation at a sub-stoichiometric lambda value of 0.95 and a super-stoichiometric lambda value of 1.05. As soon as the oxygen storage means 42 of the first catalyst volume 38 has been cleared out during a sub-stoichiometric operation of the exhaust gas burner 30, the lambda probe 34 identifies a rich blow-out. At this point in time, the forced amplitude is adjusted to a super-stoichiometric lean operation. Starting at this point in time, the oxygen storage means 42 of the first catalyst volume 38 is filled up again and the lambda probe 34 detects a stoichiometric exhaust gas. As soon as the oxygen storage means 42 of the first catalyst volume 38 has been completely filled, the lambda probe 34 identifies a lean blow-out and the forced amplitude is once again adjusted to a sub-stoichiometric operation of the exhaust gas burner 30. In this process, the alternating change between a sub-stoichiometric and a super-stoichiometric air-fuel ratio of the exhaust gas burner 30 continues until the exhaust gas burner 30 is once again deactivated. At the earliest, this takes place once the three-way catalytic converter 26 has reached it light-off temperature.

Figure 2:
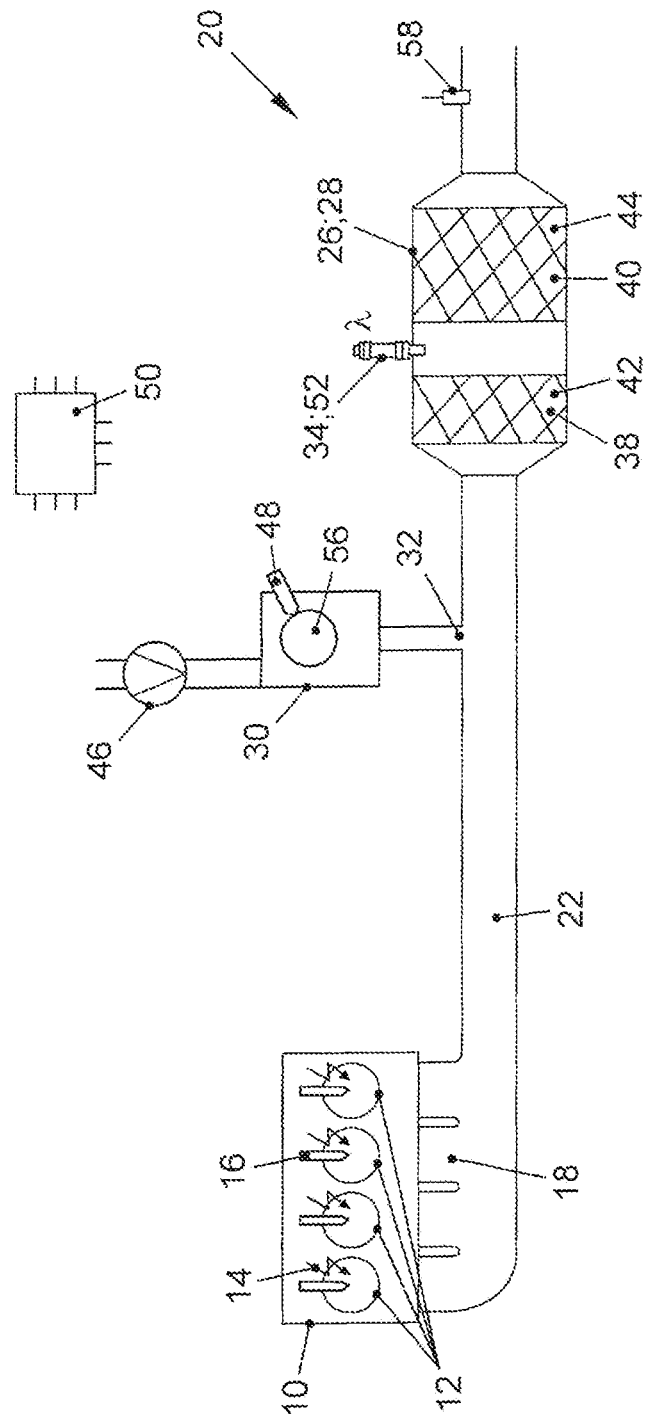
FIG. 2 is a second embodiment of an internal combustion engine with a device according to the invention for exhaust gas aftertreatment.

FIG. 2 shows an alternative embodiment of an internal combustion engine 10 with an exhaust gas system 20. Since this configuration is essentially the same as explained for FIG. 1, only the differences will be elaborated upon below. In this embodiment, the internal combustion engine 10 is configured as a naturally aspirated engine, so that the turbine 24 of the exhaust gas turbocharger 54 has been dispensed with. Moreover, in this embodiment, the lambda probe 34 is configured as a broadband probe 52, so that a quantitative determination of the exhaust gas lambda value in the three-way catalytic converter 26 is possible. Moreover, in this embodiment, the exhaust gas system 20 comprises a temperature sensor 58 with which the temperature of the three-way catalytic converter 26 can be determined at least indirectly.

The method for heating up the three-way catalytic converter 26 is carried out analogously to the method described for FIG. 1. The method is ended as soon as the temperature of the catalytic converter 26 indicated by a model or by a temperature sensor 58 has reached or exceeded a threshold value.

Figure 3:
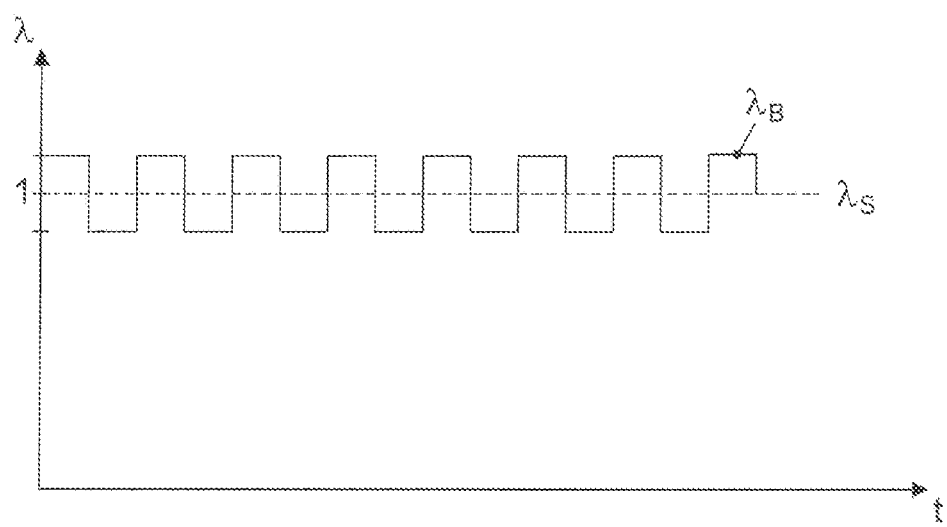
FIG. 3 is a diagram showing the course over time of the air-fuel ratio of the exhaust gas burner while a method according to the invention for exhaust gas aftertreatment is being carried out.

FIG. 3 shows the air-fuel ratio $\lambda_B$ of the exhaust gas burner 30 as well as the exhaust-gas air ratio $\lambda_S$ at the lambda probe 34. Here, the air-fuel ratio of the exhaust gas burner 30 alternates between a sub-stoichiometric air-fuel ratio and a super-stoichiometric air-fuel ratio. In this process, the oxygen storage means 42 of the first catalyst volume 38 of the three-way catalytic converter 26 is filled and cleared out, so that a stoichiometric exhaust gas $\lambda_S=1$ is established during the entire heating phase at the lambda probe 34 downstream from the first catalyst volume 38.

Thanks to the method for exhaust gas aftertreatment being proposed here, the three-way catalytic converter 26 can be heated up during the cold start phase of the internal combustion engine 10, a process in which the emissions are minimized during the heating of the three-way catalytic converter 26. During the heating phase of the three-way catalytic converter 26, the lambda regulation is carried out in such a way that the gaseous emissions of the internal combustion engine 10 are minimized until the three-way catalytic converter 26 has reached its light-off temperature and an efficient conversion of the gaseous emissions by the three-way catalytic converter 26 is ensured.

LIST OF REFERENCE NUMERALS 10 internal combustion engine
12 combustion chamber
14 spark plug
16 fuel injector
18 outlet
20 exhaust gas system
22 exhaust gas channel
24 turbine
26 three-way catalytic converter
28 lambda probe catalytic converter
30 exhaust gas burner
32 feed point
34 lambda probe
36 step change sensor
38 first catalyst volume
40 second catalyst volume
42 oxygen storage means of the first catalyst volume
44 oxygen storage means of the second catalyst volume
46 secondary air system
48 fuel injector
50 engine control unit
52 broadband probe
54 exhaust gas turbocharger
56 combustion chamber
$\lambda_B$ air-fuel ratio of the exhaust gas burner
$\lambda_E$ air-fuel ratio of the internal combustion engine
$\lambda_m$ exhaust-gas air ratio downstream from the feed point
$\lambda_S$ exhaust-gas air ratio at the lambda probe
t time

The invention claimed is:

1. A method for exhaust gas aftertreatment in an internal combustion engine having a device for exhaust gas aftertreatment, which device is adapted to be connected to an outlet of the internal combustion engine and comprises:
- an exhaust gas system with an exhaust gas channel in which a three-way catalytic converter is arranged, an exhaust gas burner, and a feed point for burner exhaust gases from the exhaust gas burner on the exhaust gas channel upstream from the three-way catalytic converter,
- wherein the three-way catalytic converter is configured as a lambda probe catalytic converter, and a lambda probe is arranged downstream from a first catalyst volume of the three-way catalytic converter and upstream from a second catalyst volume of the three-way catalytic converter,
- whereby the first catalytic volume has a lower oxygen storage capacity than the second catalyst volume,
the method comprising the following steps:
- activating the exhaust gas burner, whereby a quantity of fuel fed to the exhaust gas burner and/or a quantity of fresh air fed to the exhaust gas burner is pilot-controlled,
- detecting the air-fuel ratio downstream from the first catalyst volume and upstream from the second catalyst volume of the three-way catalytic converter, and
- changing the quantity of fuel and/or the fresh air quantity when a rich blow-out or a lean blow-out is detected at the lambda probe,
- wherein, in a first operating state of the exhaust gas burner, the quantity of fuel of the exhaust gas burner is pilot-controlled in such a way that the exhaust gas burner is operated with a sub-stoichiometric air-fuel ratio ($\lambda_B < 1$), and
- wherein, in a second operating state of the exhaust gas burner, the quantity of fuel of the exhaust gas burner is pilot-controlled in such a way that the exhaust gas burner is operated with a super-stoichiometric air-fuel ratio ($\lambda_B > 1$), and
- wherein the exhaust gas burner is operated alternately with a sub-stoichiometric air-fuel ratio ($\lambda_B < 1$) and with a super-stoichiometric air-fuel ratio ($\lambda_B > 1$).

2. The method for exhaust gas aftertreatment according to claim 1, wherein the sub-stoichiometric air-fuel ratio ($\lambda_B$) is pilot-controlled in the range from 0.93 to 0.98.

3. The method for exhaust gas aftertreatment according to claim 1, wherein the sub-stoichiometric air-fuel ratio ($\lambda_B$) is pilot-controlled in the range from 1.02 to 1.07.

4. The method for exhaust gas aftertreatment according to claim 1, further comprising deactivating the exhaust gas burner once the three-way catalytic converter has reached a threshold temperature ($T_S$).

* * * * *